United States Patent
Bennett

(10) Patent No.: US 8,656,556 B2
(45) Date of Patent: Feb. 25, 2014

(54) FOOT LOCK ROLLER ASSEMBLY

(75) Inventor: Ronald W. Bennett, Florence, SC (US)

(73) Assignee: Aluminum Ladder Company, Florence, SC (US)

(*) Notice: Subject to any disclaimer, the term of this patent is extended or adjusted under 35 U.S.C. 154(b) by 468 days.

(21) Appl. No.: 12/892,316

(22) Filed: Sep. 28, 2010

(65) Prior Publication Data
US 2012/0073082 A1  Mar. 29, 2012

(51) Int. Cl.
*E05D 15/50* (2006.01)

(52) U.S. Cl.
USPC .................................. 16/231; 14/69.5

(58) Field of Classification Search
USPC ............ 16/231, 386, 340, 342, 337; 14/69.5, 14/71.3; 248/309.1; 403/330; 182/1, 112, 182/113; 52/183
See application file for complete search history.

(56) References Cited

U.S. PATENT DOCUMENTS

| | | | |
|---|---|---|---|
| 4,133,067 A * | 1/1979 | Bennett et al. | 14/71.3 |
| 5,970,580 A * | 10/1999 | Katoh | 16/337 |
| 6,527,081 B1 | 3/2003 | Tyner et al. | 182/1 |
| 7,100,244 B2 * | 9/2006 | Qin et al. | 16/330 |
| 7,979,962 B2 * | 7/2011 | Lin | 16/367 |
| 7,996,959 B2 * | 8/2011 | Chen et al. | 16/367 |
| 2011/0078864 A1* | 4/2011 | Bennett | 14/71.7 |
| 2012/0006619 A1* | 1/2012 | Dubose et al. | 182/113 |
| 2012/0017383 A1* | 1/2012 | Honeycutt | 14/69.5 |
| 2012/0042458 A1* | 2/2012 | Bennett et al. | 14/71.3 |
| 2012/0045274 A1* | 2/2012 | Mizell et al. | 403/330 |

* cited by examiner

*Primary Examiner* — William Miller
(74) *Attorney, Agent, or Firm* — Amy Allen Hinson; Nexsen Pruet, LLC

(57) ABSTRACT

A foot lock roller assembly and apparatus is disclosed. The foot lock assembly preferably includes a cylinder, a mounting plate, and a lock bar that is particularly suitable for attachment to a device such as a gangway having a stationary base and a pivotable access. The cylinder is preferably attached to the pivotable access of the gangway by the mounting plate and includes a first and second sleeve and a clip for attaching the sleeves to the cylinder. The lock bar is preferably attached to the stationary base of the gangway. When the pivotable access of the gangway is raised the second sleeve of the cylinder is inserted into an opening in the lock bar and secures the gangway device in the raised position.

27 Claims, 5 Drawing Sheets

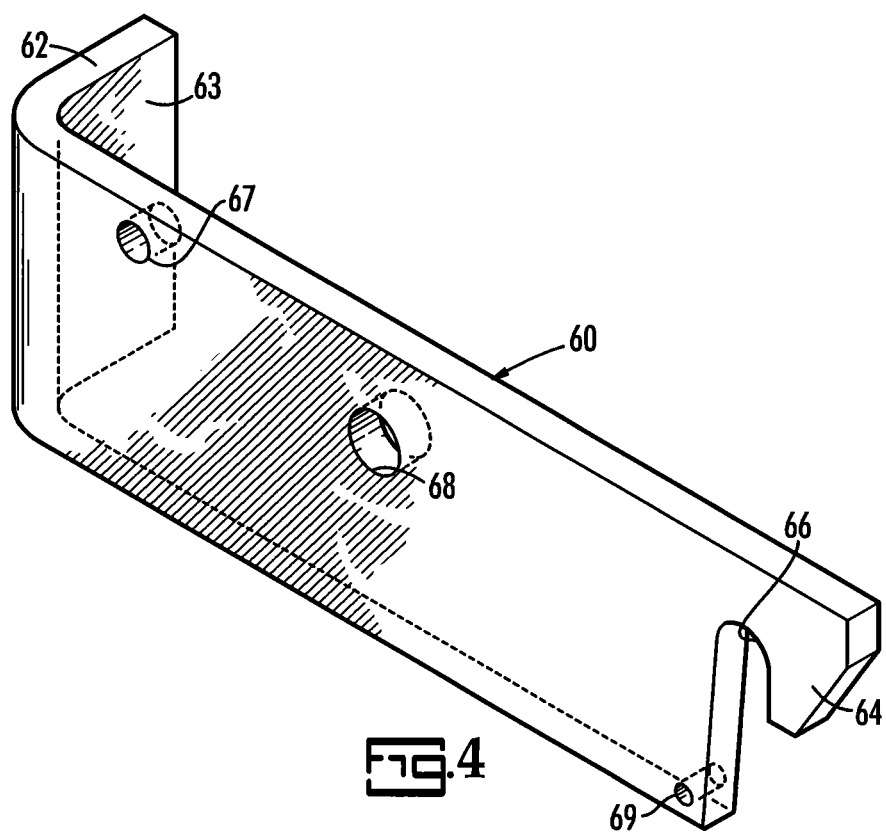

FOOT LOCK ROLLER ASSEMBLY

BACKGROUND

The present invention discloses a foot lock roller apparatus and assembly particularly suitable for use in connection with a pivotable gangway device.

A pivotable gangway device typically pivots between a raised stored position and a lowered service position to provide access to the upper surface of a container, such as a transport truck. It is known in the art to use a standard foot lock assembly attached to a pivotable gangway device however standard foot lock assemblies often encounter significant wear over time and must be frequently replaced.

Thus there is a need in the art for an effective and wear resistant foot lock assembly for use in connection with a pivotable gangway device.

SUMMARY

The present invention provides a foot lock roller apparatus. In one embodiment of the present invention, the apparatus includes a cylinder having a threaded first end and a smooth second end. The first end and the second end are separated by a collar and the second end is encased by a low-friction bushing. The low-friction bushing is encased by a cylindrical sleeve and the cylindrical sleeve and the low-friction bushing are secured to the second end of the cylinder by a clip. The clip includes an opening and extends over the second end of the cylinder.

In an alternative embodiment of the foot lock apparatus of the present invention, the foot lock apparatus includes a cylinder having a first end and a second end. The first end of the cylinder includes a low-friction bushing, a cylindrical sleeve, and a clip for securing the bushing and the sleeve to the first end of the cylinder. The foot lock apparatus also includes a mounting plate having a first segment for attachment to a pivotable device and a second segment for attachment of the second end of the cylinder.

In yet another alternative embodiment of the foot lock apparatus of the present invention, the foot lock apparatus includes a pivotable device having a stationary base and a pivotable access that is capable of being raised and lowered. The foot lock apparatus also includes a cylinder having a first end and a second end. The first end of the cylinder includes a first sleeve and a clip that secures the first sleeve onto the first end of the cylinder. The second end of the cylinder is attached to the pivotable access of the pivotable device. Further, the foot lock apparatus includes a lock bar attached to the stationary base of the pivotable device. The lock bar includes an opening wide enough for the first sleeve of the cylinder.

BRIEF DESCRIPTION OF THE DRAWINGS

FIG. 4 is a perspective view of a lock bar according to an embodiment of the present invention.

DESCRIPTION OF REPRESENTATIVE EMBODIMENTS

The present invention is related to a foot lock roller apparatus and assembly that is particularly suitable for use in connection with a pivotable gangway device. The unique design and features of the foot lock roller assembly of the present invention preferably reduces wear and thereby extends the life of the foot lock roller assembly. Although primarily described herein in terms of its use with pivotable gangway devices, it will be clear that the foot lock roller assembly of the present invention may also be used in connection with a variety of other devices. The invention will be described with reference to the figures forming an integral non-limiting part of the instant specification. Throughout the description, similar elements will be numbered accordingly.

Figure 1A:
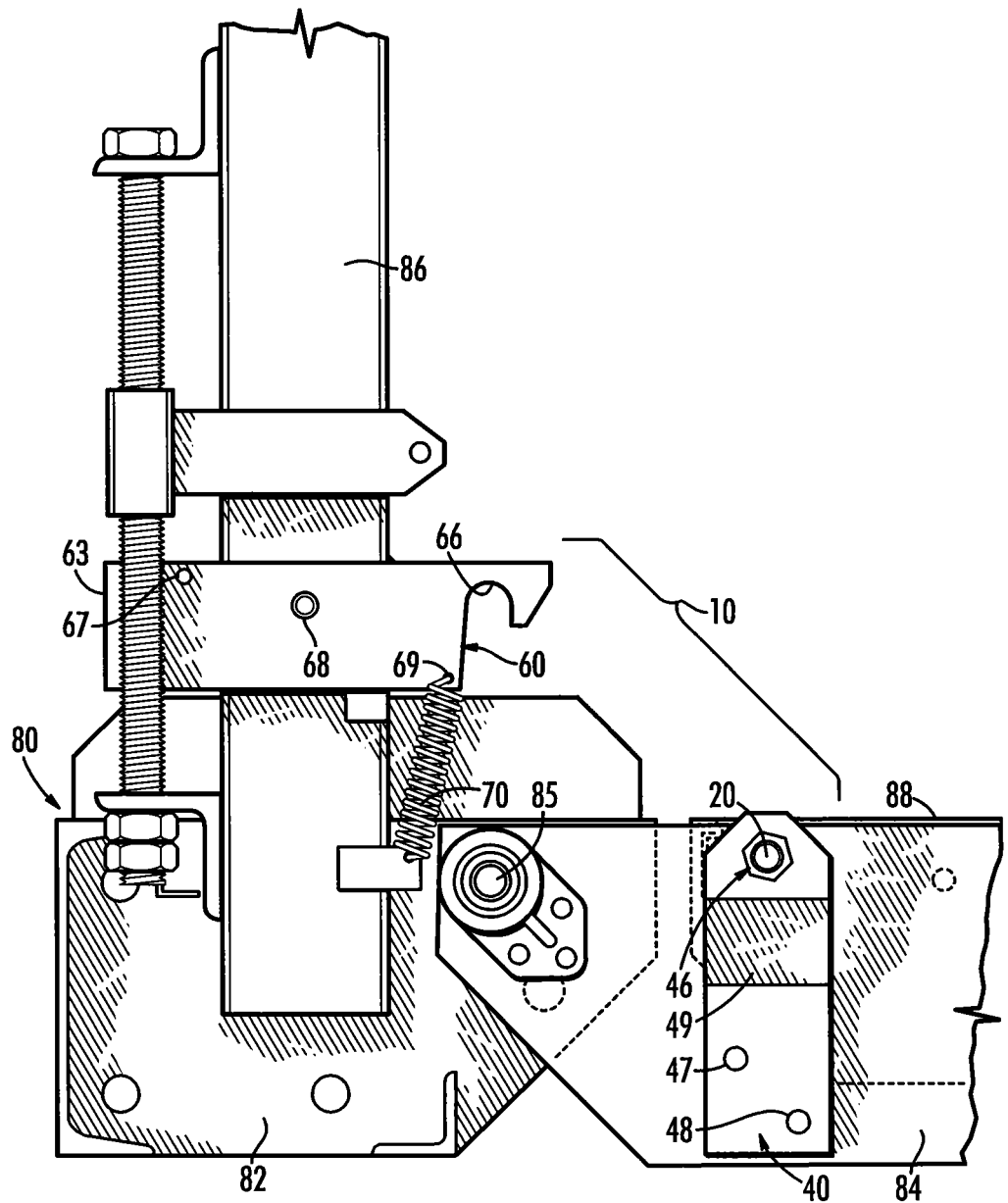
FIG. 1A is a side view of a foot lock assembly affixed to a pivotable gangway device in the lowered service position according to an embodiment of the present invention.
Figure 1B:
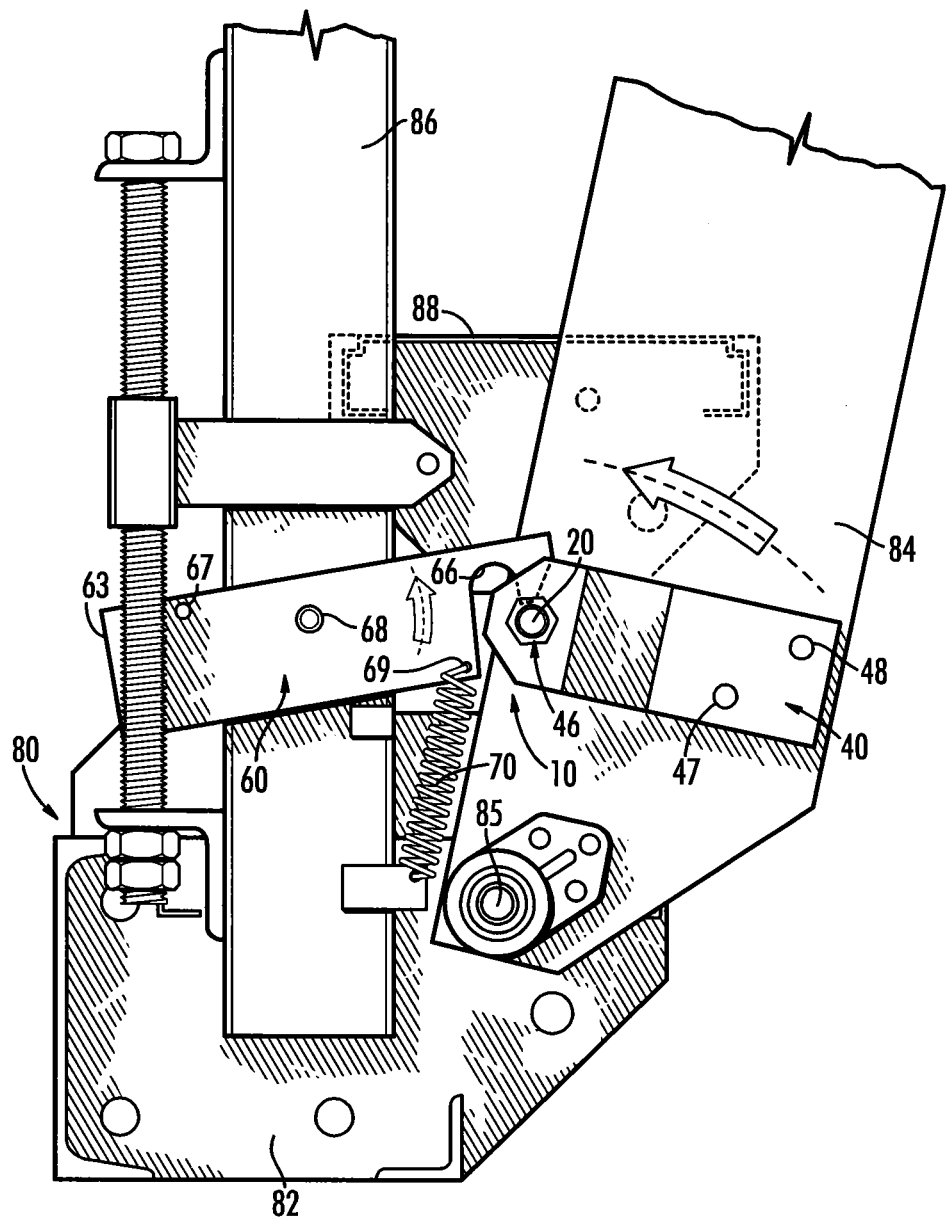
FIG. 1B is a side view of a foot lock assembly affixed to a pivotable gangway device transitioning to the raised stored position according to an embodiment of the present invention.
Figure 1C:
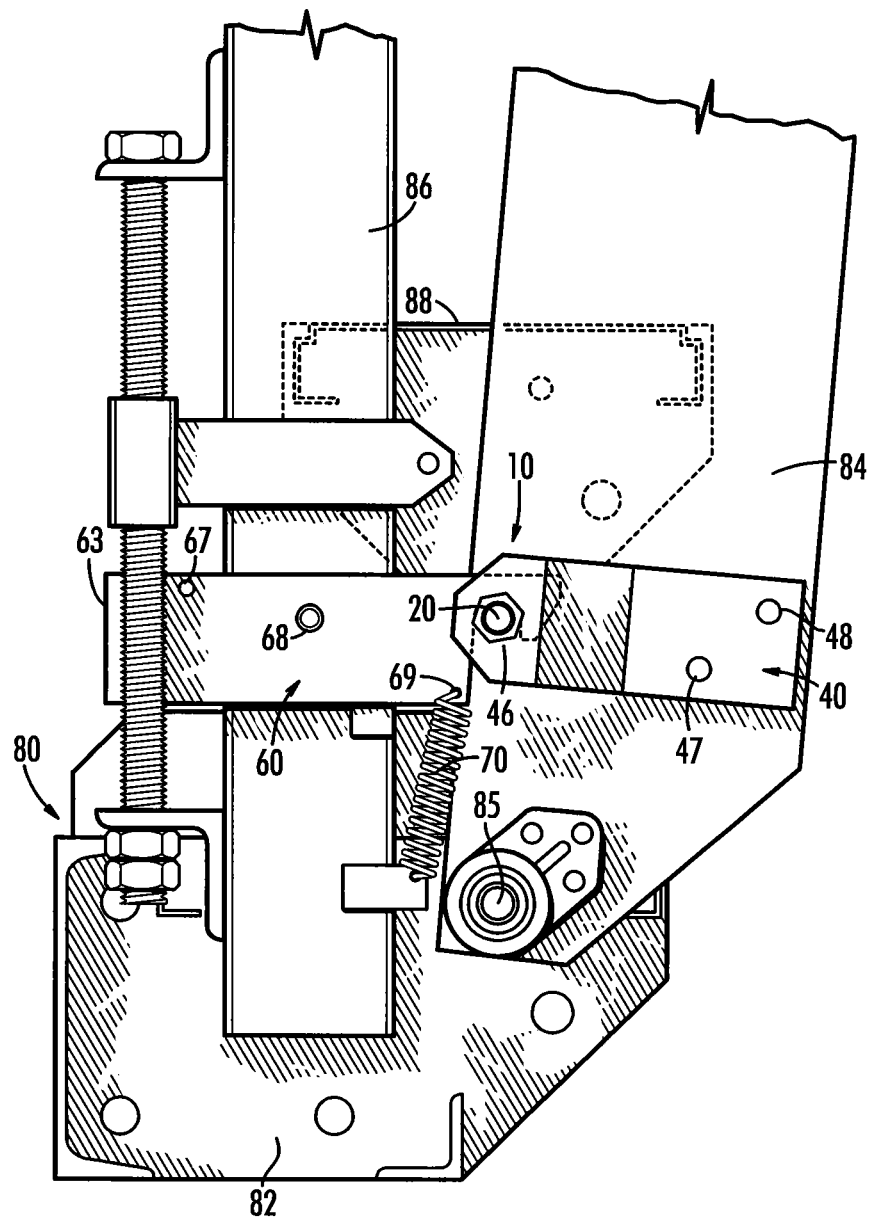
FIG. 1C is a side view of a foot lock assembly affixed to a pivotable gangway device in the raised stored position according to an embodiment of the present invention.

FIGS. 1A, 1B, and 1C represent an embodiment of the foot lock roller apparatus of the present invention. The embodiment disclosed in FIGS. 1A through 1C includes a foot lock roller assembly 10 having a cylinder 20, a mounting plate 40, and a lock bar 60 affixed to a pivotable gangway device 80. Gangway 80 preferably includes a stationary base 82 and a pivotable access 84, such as a stringer. Access 84 preferably pivots at an axis 85 between a lowered service position, as shown in FIG. 1A, and a raised stored position, as shown in FIG. 1C. Access 84 of gangway 80 typically includes steps 88 and/or a ramp that often leads to a safety cage (not shown). Cylinder 20 is preferably affixed to access 84 of gangway 80 by mounting plate 40 and lock bar 60 is preferably affixed to stationary base 82 of gangway 80.

Figure 2:
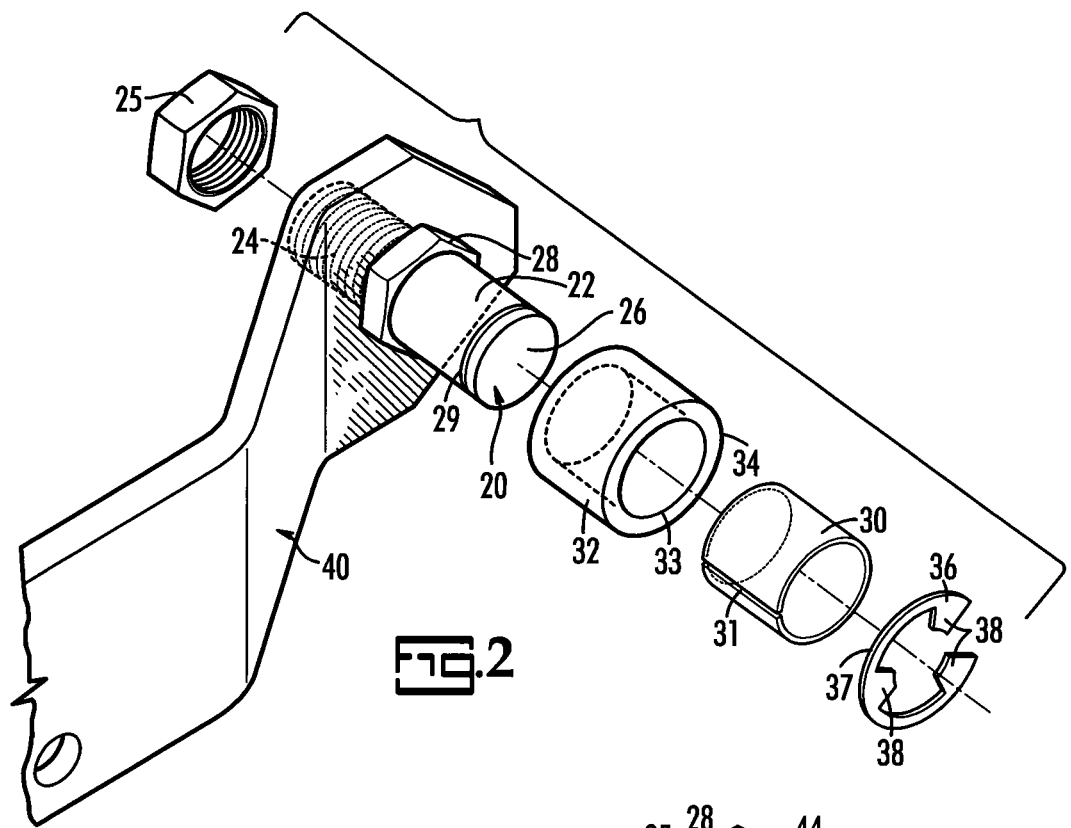
FIG. 2 is an exploded perspective view of a cylinder affixed to a mounting plate according to an embodiment of the present invention.

As shown in FIG. 2, cylinder 20 preferably includes a stud 22 having a first end 24 and a second opposing end 26. The first end 24 of stud 22 preferably includes threads and the second opposing end 26 of stud 22 is preferably smooth and does not incorporate threads. Alternatively, stud 22 is entirely threaded or entirely smooth. The first end 24 and the second end 26 of stud 22 are preferably separated by a collar 28. In one embodiment, the first and second ends 24 and 26, respectively, of stud 22 and collar 28 are integrally formed from a unitary piece of material, such as hex shaped material. In this embodiment, the first end 24 of stud 22 may be machined to the appropriate size and to include threads. Likewise, the second end 26 of stud 22 may also be machined to the appropriate size and to form a smooth cylindrical surface. In another embodiment, collar 28 is a cylindrical sleeve affixed to stud 22. In yet another embodiment, collar 28 is a nut.

The second end 26 of stud 22 preferably includes a low-friction sleeve 30, such as a bushing, and a cylindrical sleeve 32. In the embodiment shown in FIGS. 2 and 3, a low-friction split bushing having a slit 31 that extends the length of the bushing 30 is used as low-friction bushing 30 and encases a substantial portion of the second end 26 of stud 22. Alternatively, a low-friction bushing that does not include a slit is used. Low-friction sleeve 30 is preferably press fit into cylindrical sleeve 32 and preferably includes a Teflon coating or is composed of a Teflon composite material. Alternatively, low-friction sleeve 30 is composed of another low-friction material known in the art. Low-friction sleeve 30 preferably freely rotates with respect to the second end 26 of stud 22.

Figure 3:
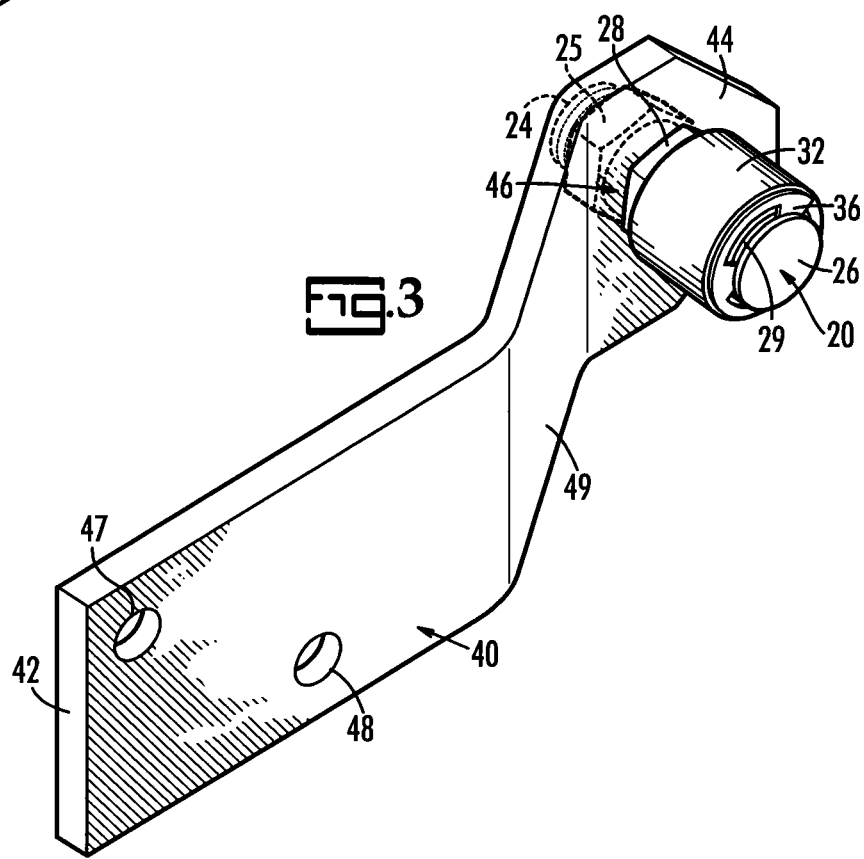
FIG. 3 is a perspective view of a cylinder affixed to a mounting plate according to an embodiment of the present invention.

As shown in FIGS. 2 and 3, cylindrical sleeve 32 preferably includes an inner diameter 33 and an outer diameter 34. As discussed above, cylindrical sleeve 32 preferably encases the low-friction sleeve 30, which is preferably press fit into cylindrical sleeve 32 so that rotation is limited between low-friction sleeve 30 and cylindrical sleeve 32. In one embodiment, cylindrical sleeve 32 is a cylindrical bushing. In another embodiment, cylindrical sleeve 32 includes a cylindrical inner diameter but may form a non-cylindrical outer shape, such as a hexagonal or a parallelogram shape. A washer and/or spacer (not shown) may be used to separate cylindrical sleeve 32 from collar 28. In an embodiment that does not include a low-friction sleeve 30, the inner diameter 33 of cylindrical sleeve 32 preferably includes a low-friction coating, such as a Teflon coating.

As further shown in FIGS. 2 and 3, a clip 36, such as a retainer clip, preferably secures cylindrical sleeve 32 and low-friction sleeve 30 onto stud 22. Clip 36 preferably includes an open-ended body 37, such as an open-ended ring, with prongs 38 extending inward from open-ended body 37. In the embodiment shown in FIG. 2, clip 36 includes three prongs 38. Stud 22 may include a recessed portion or grove 29 positioned towards the end of smooth end 26 for preferably positioning clip 36 and securing cylindrical sleeve 32 and low-friction bushing 30 to stud 22. In one embodiment, the recessed portion or groove 29 extends the entire circumference of stud 22. Alternatively, the recessed portion or grooves 29 are positioned only at the insertion points for prongs 38 of clip 26.

In one embodiment of the present invention, stud 22 of cylinder 20 is stainless steel and approximately 2.125 inches in length and between approximately 0.555 inches and 0.625 inches in diameter. In this embodiment, the threads preferably extend at least approximately 1.000 inch from one end towards the center of stud 22 and the smooth portion preferably extends at least approximately 0.937 inches from the opposing end towards the center of stud 22. If a washer is included between cylindrical sleeve 32 and collar 28, it is preferably approximately 0.062 inches in width. Collar 28 is preferably approximately 0.188 inches in width. In an embodiment having a recessed portion in the smooth end 26 of stud 22, the recessed portion is approximately 0.046 inches in width and approximately 0.200 inches from the end of stud 22. Cylindrical sleeve 32 is preferably approximately 0.700 inches in length and includes an inner diameter 33 of approximately 0.719 inches and an outer diameter 34 of approximately 0.970 inches. Low-friction sleeve 30 is preferably approximately 0.625 inches in length. In an embodiment using a low-friction split bushing 30, such as shown in FIG. 2, the inner diameter is preferably approximately 0.688 inches, the outer diameter is preferably approximately 0.750 inches, and the slit 31 is approximately 0.031 inches in width. So that the cylindrical sleeve 32 fits over the low-friction bushing 30, the outer diameter of the low-friction split bushing 30 should be no greater than the inner diameter 33 of the cylindrical sleeve 32 plus the width of the slit 31 of the low-friction split bushing 30. Having a close fit and tolerance between the outer diameter of the low-friction sleeve 30 and the inner diameter 33 of the cylindrical sleeve 32 preferably aids in preventing contamination from foreign material getting between the parts and thereby aids in extending the life of the parts. The outer diameter of clip 36 is preferably approximately 1.000 inch and is preferably at least greater than the inner diameter of the cylindrical sleeve 32.

The foot lock roller assembly and apparatus of the present invention also preferably includes a mounting plate 40. As shown in the embodiment of FIG. 3, mounting plate 40 preferably includes at least two openings 47, 48 at a first end 42 of mounting plate 40 for connecting to gangway 80 (see FIGS. 1A through 1C). Mounting plate 40 also preferably includes a third opening 46 at a second opposing end 44 for insertion of cylinder 20. Mounting plate 40 also preferably includes a sloped portion 49 between the first end 42 and second opposing end 44. Opening 46 is preferably threaded so that the threaded first end 24 of stud 22 is preferably threaded into opening 46 until the mounting plate 40 abuts collar 28. As shown in FIGS. 2 and 3, cylinder 20 is then preferably secured to mounting plate 40 by a collar 25, such as a nut, which is preferably also threaded onto first end 24 of stud 22 after cylinder 20 is positioned. Alternatively, opening 46 of mounting plate 40 is not threaded and cylinder 20 may be simply secured to mounting plate 40 by collar 25. Washers and/or spacers may be positioned as needed between mounting plate 40 and collar 28 and mounting plate 40 and collar 25.

The foot lock roller assembly and apparatus of the present invention also preferably includes a lock bar 60. As shown in FIG. 4, lock bar 60 is preferably "L" shaped with a first end 62 of the "L" shape preferably having a pedal 63, such as a foot pedal, and the opposing second end 64 preferably having an opening 66, such as a hooked opening. Lock Bar 60 also preferably includes openings 67, 68, 69. Opening 67 may be used for the addition of pneumatic components, such as pneumatic actuators and opening 69 is preferably for attachment of one end of a spring 70 (shown in FIGS. 1A through 1C), which is preferably attached at its opposing end to the base 82 of gangway 80. Opening 68 is for attachment, such as by a bolt, to preferably the base 82 of gangway 80. As shown in FIGS. 1A through 1C, lock bar 60 is preferably spring loaded so that when a downward force is applied to pedal 63, lock bar 60 pivots at opening 68 and the first end 62 of pedal 60 moves downward while the opposing second end 64 of pedal 60 moves upward. When the downward force is removed, lock bar 60 returns to its preferably horizontal position as shown in FIG. 1A. Opening 66 is preferably wide enough to receive cylindrical sleeve 32 of cylinder 20. Lock bar 60 is preferably approximately 10.6 inches in length and preferably approximately 3 inches in height. In one embodiment, lock bar 60 is a 3 inch by ⅜ inch stainless steel bar. In this embodiment, pedal 63 is preferably approximately 2 inches deep.

As shown in FIGS. 1A through 1C, the foot lock roller assembly 10 may be configured to attach to an existing gangway structure 80. In the embodiment shown in FIGS. 1A through 1C, cylinder 20 is secured to mounting plate 40 at opening 46. Attaching devices such as bolts extend through openings 47 and 48 of mounting plate 40 to secure mounting plate 40 preferably to the access 84 of gangway 80. As discussed above, access 84 preferably pivots between a raised stored position, as shown in FIG. 1C, and a lowered service position, as shown in FIG. 1A. Lock bar 60 is preferably affixed to stationary base 82 of gangway 80. In the embodiment shown, lock bar 60 is affixed to post 86 of stationary base 82 of gangway 80 at opening 68 by a bolt and pivots with respect to post 86 at opening 68. Lock bar 60 is also attached to the base 82 of gangway 80 at opening 69 by spring 70. Other devices and techniques may be used for attaching the various parts of the foot lock roller assembly 10 of the present invention to an existing gangway structure without departing from the spirit and the scope of the present invention. Alternatively, the foot lock roller assembly 10 is formed as an integral apparatus with a gangway structure.

FIG. 1A illustrates an embodiment of the foot lock roller assembly 10 when the gangway 80 is in the lowered service position. In this position, access 84 is pivoted to an approximately horizontal direction. Mounting plate 40 is secured to access 84 at openings 47 and 48 and positioned so that sloped portion 49 angles away from access 84. Cylinder 20 is mounted to mounting plate 40 at opening 46. In this embodiment, lock bar 60 is mounted to post 86 of gangway base 82 and preferably extends approximately horizontal and perpendicular in relation to post 86. In this position, spring 70, which is attached to lock bar 60 at opening 69, is under little if any tension. Preferably, post 86 and gangway base 82 remain stationary when access 84 is raised and lowered.

When it is necessary to raise access 84 of gangway 80 from the position shown in FIG. 1A, access 84 pivots around axis 85 towards a vertical direction as shown in FIG. 1B. Cylinder 20 approaches opening 66 of lock bar 60 and preferably causes the second end 64 of lock bar 60 to raise upward and spring 70 to extend under tension. Access 84 eventually raises enough that cylindrical sleeve 32 of cylinder 20 is received into opening 66 of lock bar 60 and lock bar 60 returns to its preferably horizontal position as shown in FIG. 1C. Spring 70 is then able to contract to its less-tensioned position. In this position, cylindrical sleeve 32 of cylinder 20 is positioned within hooked opening 66 and secures the gangway 80 in the raised stored position.

When it is necessary to lower access 84 of gangway 80 from the position shown in FIG. 1C, downward force is preferably applied to lock bar 60 preferably at pedal 63. The downward force on the first end 62 of lock bar 60 preferably causes the second end 64 of lock bar 60 to rise upward and tension to occur in spring 70. Eventually the second end 64 of lock bar 60 preferably rises enough that cylindrical sleeve 32 of cylinder 20 becomes unhooked from opening 66 of lock bar 60. Lock bar 60 preferably returns to its preferably horizontal position as shown in FIG. 1A and spring 70 contracts to its less-tensioned position. As further shown in FIG. 1A, access 84 pivots around axis 85 to its approximately horizontal position and access is now provided to devices such as the upper surface of a container.

It should be noted that there are several configurations suitable for the design of the foot lock assembly and apparatus of the present invention, and the shapes, sizes, and dimensions of the parts of the foot lock assembly and apparatus discussed above are for example only and represent but one of the configurations of the foot lock assembly and apparatus. Other configurations altering the number of parts, attachment positions of the parts, means for attaching and securing the parts, and shapes, sizes, and dimensions of the parts could be employed to demonstrate the invention and are intended to be encompassed by the present invention. The description and drawings should not be deemed to narrow the scope of the present invention in any way.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above described exemplary embodiments.

In addition, it should be understood that the figures, which highlight the functionality and advantages of the present invention, are presented for purposes of example only. The architecture of the present invention is sufficiently flexible and configurable, such that it may be used in ways other than that shown in the accompanying figures.

Further, the purpose of the Abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The Abstract is not intended to be limiting as to the scope of the invention in any way.

What is claimed is:

1. A foot lock apparatus comprising:
   a cylinder having a threaded first end and a smooth second end, said first end and said second end separated by a collar, said second end encased by a cylindrical sleeve, said cylindrical sleeve secured to said second end of said cylinder by a clip having an opening, said clip extending over and secured to said second end of said cylinder, and a bushing encased by said cylindrical sleeve and encasing said second end of said cylinder, said bushing is secured to said second end of said cylinder by said clip.

2. The apparatus of claim 1 wherein said second end of said cylinder further comprises a recess, said clip engages said recess to secure said cylindrical sleeve and said bushing to said second end of said cylinder.

3. The apparatus of claim 2 wherein said clip forms an open-ended ring and comprises prongs extending inward towards a center of said open-ended ring, said prongs engage said recess to secure said cylindrical sleeve and said bushing to said second end of said cylinder.

4. The apparatus of claim 1 wherein said bushing comprises a split bushing.

5. The apparatus of claim 4 wherein an outer diameter of the bushing is greater than an inner diameter of the cylindrical sleeve.

6. The apparatus of claim 1 wherein said bushing is Teflon coated.

7. The apparatus of claim 1 wherein said first and second ends of said cylinder and said collar are integrally formed.

8. The apparatus of claim 1 wherein said cylinder comprises a stainless steel stud.

9. The apparatus of claim 1 wherein said collar comprises a nut.

10. The apparatus of claim 1 wherein said clip comprises an E-clip.

11. The apparatus of claim 1 wherein said foot lock apparatus further comprises a mounting plate for mounting said cylinder at said first end to a pivotable gangway device.

12. The apparatus of claim 1 wherein said foot lock apparatus further comprises a pivotable gangway device, said cylinder attached to said pivotable gangway device.

13. A foot lock apparatus comprising:
   a cylinder having a first end and a second end, said first end having a cylindrical sleeve and a clip secured to said first end for securing said sleeve to said first end of said cylinder; said first end of said cylinder further comprising a bushing encased by said cylindrical sleeve, said clip secures said bushing to said first end of said cylinder; and
   a mounting plate having a first segment for attachment to a pivotable device and a second segment attached to said second end of said cylinder.

14. The apparatus of claim 13 wherein said foot lock apparatus further comprises a lock bar for attachment to said pivotable device, said lock bar having an opening receiving said cylindrical sleeve.

15. The apparatus of claim 14 wherein the shape of said cylindrical sleeve corresponds with the shape of said opening of said lock bar.

16. The apparatus of claim 14 wherein said foot lock apparatus further comprises said pivotable device, said pivotable device comprises a stationary base and a pivotable access, said first segment of said mounting plate is attached to said pivotable access of said pivotable device and said lock bar is attached to said stationary base of said pivotable device.

17. The apparatus of claim 16 wherein said pivotable device is a gangway.

18. The apparatus of claim 13 wherein said bushing comprises a split bushing and said clip comprises an E-clip.

19. A foot lock apparatus comprising:
  a pivotable device having a stationary base and a pivotable access, said pivotable access capable of being raised and lowered;
  a cylinder having a first end and a second end, said first end having a first sleeve, said first end further having a clip secured thereto for securing said first sleeve onto said first end of said cylinder, said second end of said cylinder attached to said pivotable access of said pivotable device; and
  a lock bar attached to said stationary base of said pivotable device, said lock bar having an opening receiving said first sleeve of said cylinder.

20. The apparatus of claim 19 wherein said lock bar further comprises a pedal and a spring, said spring is attached to said base of said pivotable device and said lock bar is pivotably attached to said base of said pivotable device.

21. The apparatus of claim 20 wherein when said pivotable access is raised, said first sleeve of said cylinder is received in said opening of said lock bar.

22. The apparatus of claim 21 wherein when force is applied to said pedal of said lock bar, said lock bar pivots with respect to said pivotable device.

23. The apparatus of claim 22 wherein when said first sleeve of said cylinder is received in said opening of said lock bar and said force is applied to said pedal, said lock bar pivots and said first sleeve of said cylinder is removed from said opening of said lock bar.

24. The apparatus of claim 19 wherein said foot lock apparatus further comprises a cage, said cage is attached to said pivotable access of said pivotable device.

25. The apparatus of claim 19 wherein said cylinder further comprises a second sleeve, said first sleeve encases said second sleeve.

26. The apparatus of claim 25 wherein said second sleeve is a low-friction bushing.

27. The apparatus of claim 19 wherein said first sleeve includes an inner diameter having a low-friction coating.

* * * * *